(12) United States Patent
Ungerecht

(10) Patent No.: US 6,554,233 B1
(45) Date of Patent: Apr. 29, 2003

(54) HOSE CLAMP WEIGHT

(75) Inventor: Cliff P. Ungerecht, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 0 days.

(21) Appl. No.: 09/773,769

(22) Filed: Feb. 2, 2001

(51) Int. Cl.⁷ ............................................... A62C 13/76
(52) U.S. Cl. ........................................................ 248/75
(58) Field of Search ............................... 248/75, 76–93, 248/910; 239/726, 728, 734; 137/899

(56) References Cited

U.S. PATENT DOCUMENTS

| | | | |
|---|---|---|---|
| 1,435,674 A | | 11/1922 | Varga |
| 1,828,678 A | | 10/1931 | Peterman et al. |
| 2,120,155 A | | 6/1938 | Shera |
| 2,407,682 A | | 9/1946 | Poz |
| 2,765,487 A | | 10/1956 | Foster |
| 3,889,313 A | | 6/1975 | Hulthen ........................... 16/1 |
| 4,676,438 A | * | 6/1987 | Sesser ......................... 239/722 |
| 4,795,100 A | * | 1/1989 | Purtell et al. ............... 239/734 |
| 4,949,905 A | * | 8/1990 | Jones et al. .................. 239/279 |
| 5,267,695 A | * | 12/1993 | Thayer ........................ 239/566 |
| 5,311,909 A | * | 5/1994 | Adcock ....................... 137/899 |
| 5,333,796 A | * | 8/1994 | Purtell ........................ 239/734 |
| 5,465,458 A | | 11/1995 | Schlager ...................... 16/1 R |
| 6,343,749 B1 | * | 2/2002 | Thom ............................. 239/1 |

OTHER PUBLICATIONS

"I–Wob" brochure, Senninger Irrigation Inc., Mar. 3, 1999.

* cited by examiner

Primary Examiner—Kimberly Wood
Assistant Examiner—Gwendolyn Baxter
(74) Attorney, Agent, or Firm—Nixon & Vanderhye P.C.

(57) ABSTRACT

A drop weight and connector assembly for use with an irrigation component mounted at a lower end of a flexible hose includes a tubular connector component having a first end adapted for insertion into the lower end of the flexible hose and a second end that is threaded and adapted for receiving a corresponding threaded end of the irrigation component. A drop weight component includes a relatively heavy tubular sleeve having one end that cooperates with the barbed end of the connector component to thereby clamp the lower end of the hose between the connector and drop weight components, the sleeve being sufficiently heavy to provide stability to the flexible hose and irrigation component.

25 Claims, 5 Drawing Sheets

HOSE CLAMP WEIGHT

TECHNICAL FIELD

This invention relates to sprinkler heads used on linear and center pivot irrigation systems and, specifically, to a combined clamp and weight used to stabilize a sprinkler head suspended from a water supply pipe.

BACKGROUND

Linear and center pivot irrigation systems typically include elevated lateral water supply pipes supported on mobile, wheeled carriages. Sprinkler heads are usually mounted directly on the pipe, or suspended from the pipe by flexible hoses, often referred to as "drop" hoses. The latter arrangement is employed to locate the sprinkler heads closer to the ground and/or crops. It is often necessary, however, to stabilize the sprinkler heads when so suspended, so as to minimize the effects of wind, torque due to rotation of the sprinkler head, and even engagement with tall crops, such as corn.

It is well known to provide weights in the form of relatively rigid plastic sleeves that are slidably received over the drop hose and that fall under the force of gravity to the lower region of the plastic hose, with the sprinkler head serving as a stop. The sprinkler head itself is secured to the hose utilizing a conventional two-piece connector. One part of the connector has a barbed end to be inserted into the hose and a male threaded end that mates with a female threaded end of the sprinkler head. A second connector part clamps the hose end to the barbed end of the first connector part. The second connector part is typically an Oetiker ear type clamp or a screw type clamping ring. The more prevalent Oetiker ear type clamps, while effective, must be destroyed to remove them in the event it is necessary to change sprinkler heads.

It is also known to slide a donut-shaped weight over the flexible drop hose, also located by gravity above the connector and/or sprinkler. Some are designed to slide over part of, and locate on the sprinkler component itself. Such weights are typically made of cast iron, zinc or concrete. Materials chosen are typically designed around a desired 1–2 lb. weight.

It is also known to insert a galvanized pipe or polyethylene tube axially between the flexible hose and sprinkler component, the pipe adding the weight necessary for stability, and helping to straighten the drop hose.

SUMMARY OF THE INVENTION

In one embodiment, this invention simplifies the hose sprinkler and weight assembly by combining the weight and clamp component of a hose end connector. Specifically, a unique drop weight is provided in the form of two identical half-sleeves with an interior profile that includes a pair of annular, axially spaced ribs, at least one of which is always available to clamp the hose end between the rib and the barbed end of the insert component of the connector.

The facing edges of each half-sleeve component of the drop weight may be provided with complimentary pegs and holes to accurately locate the two half-sleeve components, and screw fasteners may be used to clamp the two half-sleeve components about the hose end. This arrangement is also advantageous in that disassembly to change sprinkler heads is facilitated and no new connector or clamp parts are required.

Because the half sleeve components are identical, assembly is easy since no special alignment is required. Moreover, by providing interior clamping rings or ribs in opposite end regions of the drop weight, the user can assemble the half-sleeve components with either end facing up.

The drop weight itself is preferably constructed of metal and the outer diameter and length can be varied to arrive at the desired weight, i.e., that weight that provides the required stability. It will be appreciated that the inner diameter of the drop weight, as well as the clamping rings or ribs, will be determined by the hose end and connector diameters.

In an alternative embodiment, the drop weight may be provided in the form of a substantially solid cylinder, with a removable 180° section at one end thereof that is used to effect clamping of the hose end.

In still another but less preferred embodiment, the drop weight may be provided as a solid cylinder with a profiled end adapted to be received within the end of a clamp component of the two-piece hose end connector. While this embodiment does not reduce the number of parts in the assembly, it does provide a convenient way to secure the weight in place on the hose end.

In still another embodiment, a cylindrical drop weight is slidably located over a drop hose and threaded onto an integrally threaded fitting, securing the drop weight and also sealing the drop hose to the fitting. The latter function is achieved by providing an internal reduced diameter or neck adjacent the internal thread on the inside surface of the weight that presses the drop hose inwardly about an annular barb formed adjacent the external thread on the fitting or regulator.

Accordingly, in its broader aspects, the invention relates to a drop weight and connector assembly for an irrigation component mounted at a lower end of a flexible hose, the assembly comprising a connector component having one end adapted for insertion into the lower end of the flexible hose; and a second connector drop weight component comprising a relatively heavy tubular sleeve having an end that cooperates with the one end of the first component to thereby clamp the lower end of the hose between the connector and drop weight components; the sleeve sufficiently heavy to provide stability to the flexible hose and irrigation component.

In still another aspect, the invention relates to a hose clamp and connector assembly for an irrigation component secured to a flexible hose comprising a first component having a first barbed end and a second threaded end; and a second component comprising a cylindrical sleeve, one end of which is adapted to cooperate with the barbed end of the first component, and a second end of which extends beyond the first component, the sleeve being sufficiently heavy to provide stability.

In still another aspect, the invention relates to a hose clamp and connector assembly comprising a connector component adapted to have one end thereof inserted into a flexible tube; and a drop weight component comprising a substantially cylindrical sleeve, one end of which includes a removable segment adapted to cooperate with the connector component, wherein the drop weight component extends axially beyond the connector component and is substantially heavy to provide stability.

In still another aspect, the invention relates to a hose clamp and connector assembly comprising a cylindrical weight component having a reduced diameter flange at one end thereof; and a connector assembly including a first part having a barbed end adapted for insertion into a hose end, and a second part comprising a cylindrical clamp including a groove for receiving the reduced diameter flange and a clamping ring adapted to clamp the hose end to the barbed end of the first part of the connector assembly.

In still another aspect, the invention relates to a drop weight for an irrigation component comprising a cylindrical sleeve having a through bore including a first axial portion of substantially constant inside diameter commencing at one end of said sleeve; an internal thread at an opposite end of the sleeve; and a reduced diameter neck axially between said first axial portion and said internal thread.

DETAILED DESCRIPTION OF THE INVENTION

Figure 1:
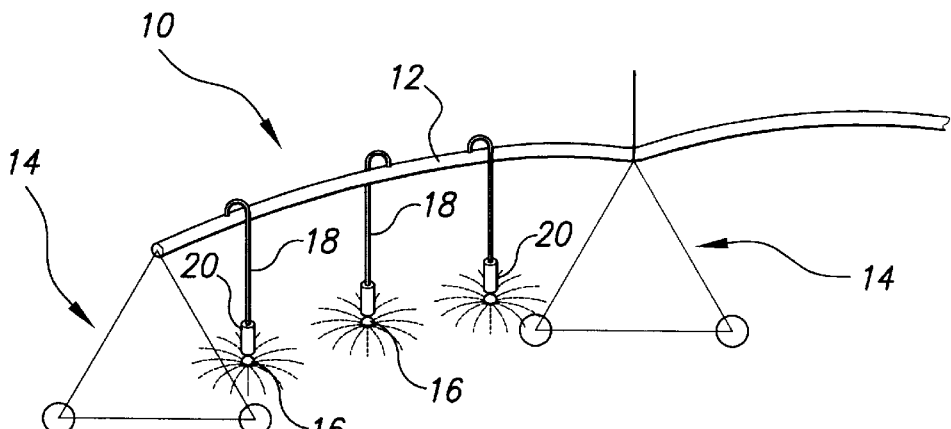
FIG. 1 is a partial perspective of a conventional irrigation apparatus utilizing weights to stabilize sprinklers suspended from an overhead water supply pipe.

With reference to FIG. 1, conventional irrigation apparatus 10, which could be of the linear or pivot type, includes an elevated water supply conduit or pipe 12, supported on wheeled carriages 14. Sprinkler heads 16 may be mounted directly on the pipe 12 or may be suspended from the pipe by means of flexible tubes or hoses 18. In the latter case, a conventional hose end connector (not visible in FIG. 1) is inserted into the hose end and clamped by means of, for example, an Oetiker ear type clamp, or a screw-type clamp ring.

As mentioned above, one prior art solution to the stability problem includes a relatively heavy plastic sleeves 20 slid over the flexible hoses 18 as the latter are suspended from the pipe 12 so that, under the force of gravity, the sleeve weights fall to the bottom of the hose, stopped by an exposed flange on the hose end connector or by the sprinkler head itself. Weights of this type are typically 18–24 inches in length. The lower ends of the sleeve may be slotted at the inner diameter to accommodate raised projections on the clamps, particularly on the Oetiker ear type clamps.

Figure 2:
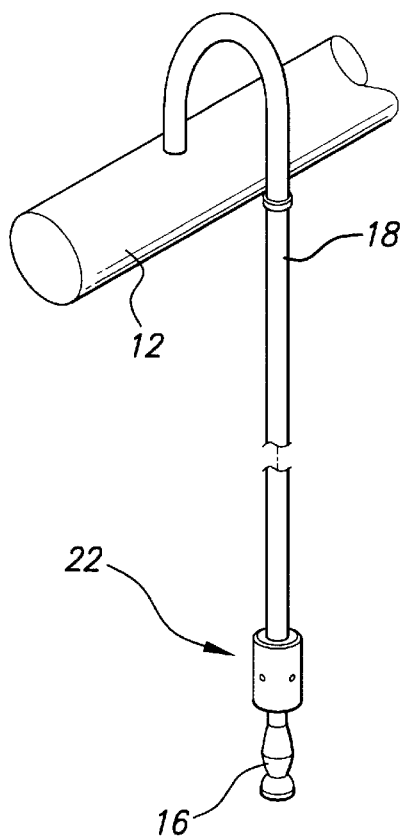
FIG. 2 is an enlarged detail of a sprinkler suspended by a flexible hose, along with a drop weight in accordance with one embodiment of the invention.
Figure 3:
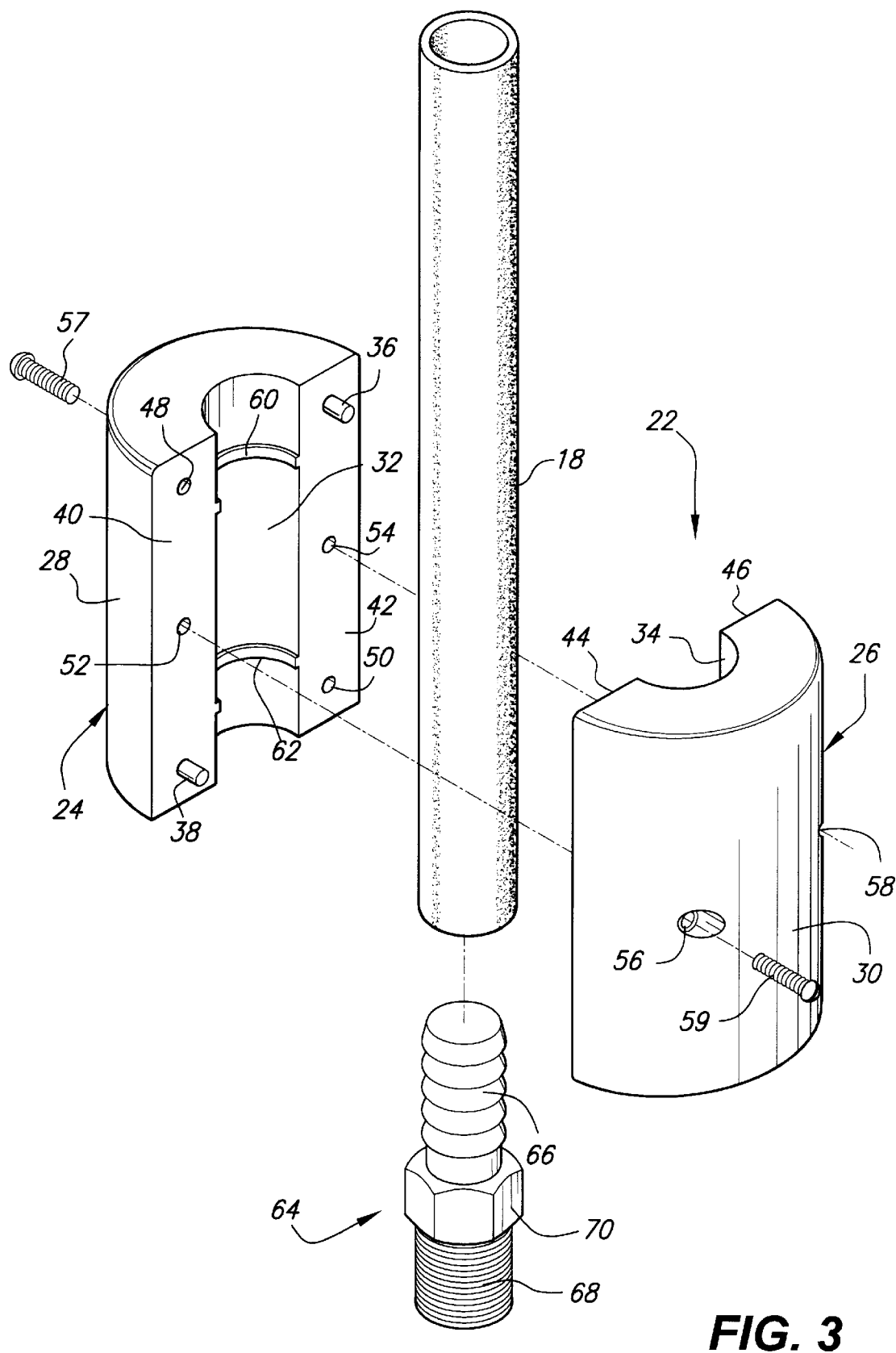
FIG. 3 is an exploded view of a drop weight and hose end connector shown in FIG. 2.

Turning now to FIGS. 2 and 3, the present invention provides a combined drop weight and hose end connector clamp component. Specifically, the drop weight 22 includes a pair of identical half-sleeve components 24, 26, having respective outside or exterior surfaces 28, 30 and respective interior surfaces 32, 34. The interior surfaces 32, 34 define a through bore when the half-sleeve components are assembled.

Half-sleeve component 24 is provided with a pair of pins or pegs 36, 38 at opposed "corners" of interface edges 40, 42 and are adapted to seat within complementary holes (not visible but similar to holes 48, 50) in the interface edges 44, 46 of sleeve component 26. Similarly, sleeve component 26 is provided with pins or pegs (not visible but similar to pins 36, 38) adapted to seat within complementary holes 48, 50 in the interface edges 40, 42 of sleeve component 24.

Fastener holes 52, 54 in sleeve component 24 align with fastener holes 56, 58 in sleeve component 26 so that the sleeve components can be securely clamped together along the respective interface edges 40, 42 and 44, 46 by screws 57, 59. The fastener holes are located approximately midway along the length of the sleeve component, axially between semi-annular rings or ribs 60, 62 that define annular clamping rings when the sleeve components 24, 26 are assembled.

The drop weight 22 as described above is intended to be used with a conventional insert connector component 64 of a typical two-piece hose end connector. Connector insert component 64 has a barbed end 66 to be inserted into the end of hose 18, and a threaded end 68 to which a conventional sprinkler head 16 (FIGS. 1, 2) is secured. A "bolt head" 70 is interposed between the barbed end 66 and the threaded end 68 and may be used to aid in tightening the threaded connection with a sprinkler head 16. It will be appreciated, however, that threaded end 68 may be secured to a conventional pressure regulator or other specialty device which, in turn, mounts a sprinkler head 16. Alternatively, the hose barb may be an integral component of a pressure regulator or sprinkler.

With the connector component 64 inserted into the hose end, the drop weight sleeve components 24, 26 can be secured about the hose end, with the lower end of the drop weight 22 surrounding the barbed end 66 of the connector component 64.

Note that, regardless of the up/down orientation of the sleeve components 24, 26, one of the annular clamping rings 60 or 62 will engage and clamp the hose 18 along the length of the barbed end 66 of the connector component 64, thus insuring good clamping of the hose end to the hose end connector, as well as secure, stationary attachment of the drop weight 22 to the hose 18.

The drop weight 22 is preferably made of a corrosion resistant metal such as zinc but other materials could be used as well. The outer diameter of the drop weight and its axial length may be adjusted, depending on the material selection, to arrive at the desired weight which would normally be expected to be 1–2 lbs. or more. Thus, the drop weight is substantially heavier than the hose connector insert component that weights only a few ounces. Using zinc material, an exemplary clamp may have an outside diameter of about 2 inches and an axial length of about 4 inches.

It will be appreciated that by employing the above described drop weight, the conventional clamp component of the hose end connector can be eliminated, thereby reducing cost and facilitating ease of assembly and disassembly of components from the flexible drop hose.

Figure 5:
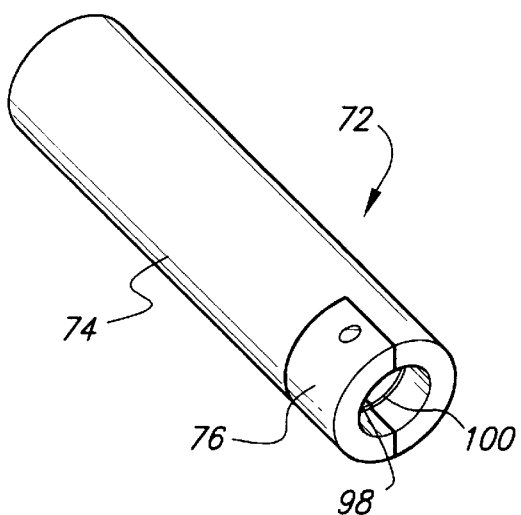
FIG. 5 is a perspective view of the drop weight shown in FIG. 4, with the parts assembled.
Figure 4:
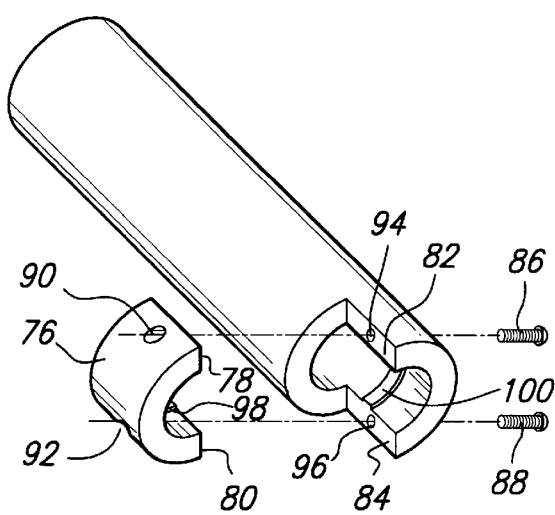
FIG. 4 is an exploded perspective view of a drop weight in accordance with a second embodiment of the invention.

In an alternative drop weight embodiment illustrated in FIGS. 4 and 5, the metal weight 72 is formed as a substantially cylindrical sleeve 74 but with a relatively short axial segment of semi-cylindrical shape removed. The removed segment is replaced by a clamp component or segment 76, interface edges 78, 80 of which are adapted to engage the respective interface edges 82, 84 on the weight. Self-tapping screw fasteners 86, 88 may be used to secure the preferably plastic segment 76 via aligned fastener hole pairs 90, 92 and 94, 96. A clamping ring formed by semi-annular ribs 98, 100 serve to positively clamp the hose end to the connector component.

Figure 6:
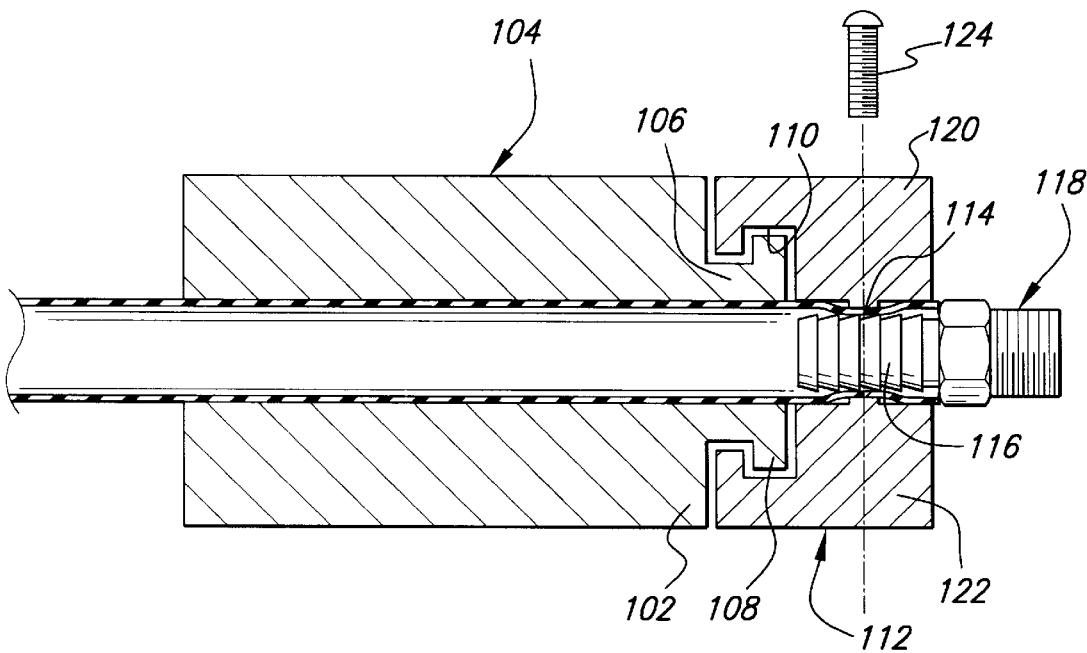
FIG. 6 is a section view through a drop weight in accordance with a third embodiment of the invention.

In still another but less preferred embodiment (FIG. 6), the lower end 102 of a one (or two) piece drop weight sleeve 104 is machined to include a profiled end 106 that includes a reduced diameter annular flange 108. The latter is adapted to be received in an annular groove 110 of a complementary two-piece clamp component 112. The clamp component includes an internal clamping ring 114 that clamps the hose end on the barbed end 116 of a connector component 118. The clamp component 112 comprises a pair of semi-cylindrical halves 120, 122 that are secured by screw fasteners 124 (one shown). This embodiment secures the drop weight 104 to the clamp component 112 but otherwise does not reduce the number of parts required.

Figure 7:
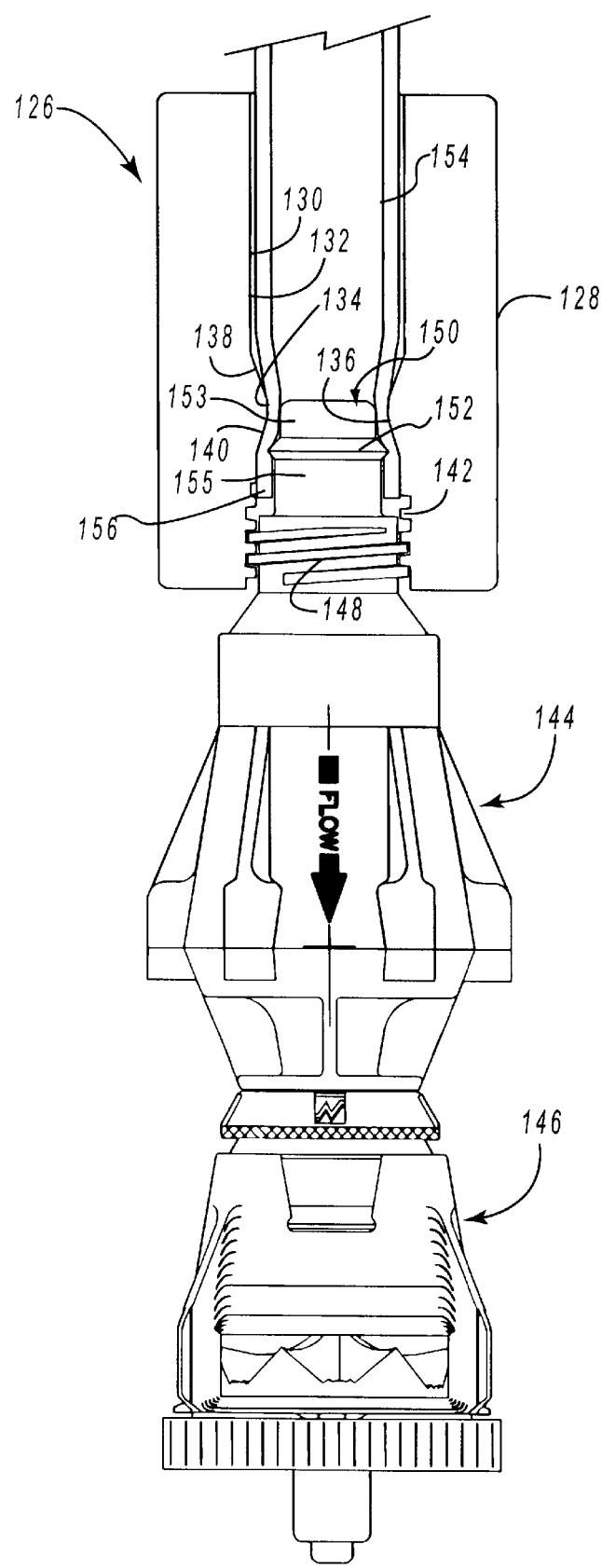
FIG. 7 is a side elevation, partly in section, of a drop weight in accordance with a fourth embodiment of the invention.

Turning now to FIG. 7, a drop weight 126 in accordance with another exemplary embodiment has a substantially cylindrical outer surface 128 and an interior through bore 130 having a first inside diameter along a smooth axial portion 132 extending from one end of the weight. A reduced diameter neck 134 is formed axially adjacent the portion 132, with a radially innermost (or smallest ID) ring at 136 between a pair of tapered portions or ramps 138, 140. An internal thread 142 is formed at the other end of the bore 130, adjacent the neck 134.

A regulator 144, secured at one end to a sprinkler 146, is provided at its opposite or inlet end with an external thread 148 and an extended connector portion 150 formed with an annular barb 152 axially between relatively smaller and larger diameter portions 153, 155. With the drop hose 154 pushed over the barb 152, and with the edge 156 of the drop hose 154 abutting or at least closely adjacent the thread 148, the drop weight 126 is pushed along the drop hose 154 such that the drop weight may be threaded onto the regulator. As the drop weight is rotated into threaded engagement, the neck 134 moves toward the barb 152, pressing or clamping the drop hose 154 into sealing engagement with the barb. Note that the innermost ring 136 ultimately lies radially adjacent the remote end of the connector portion 150 and axially adjacent the barb 152 at the thread limit, thus insuring no damage to the drop hose. At the same time, the pressure effected by the neck 134 is sufficient to cause sealing engagement between the drop hose and the regulator barb 152, thus eliminating any possibility of leakage along the connector portion 150 and thread 148.

The drop weight 126 preferably weights 1–2 lbs. and may be constructed of any of the materials mentioned above.

It will be appreciated that the drop hose and drop weight could also be attached directly to a sprinkler component having an externally threaded end similar to the regulator as described above.

Figure 8:
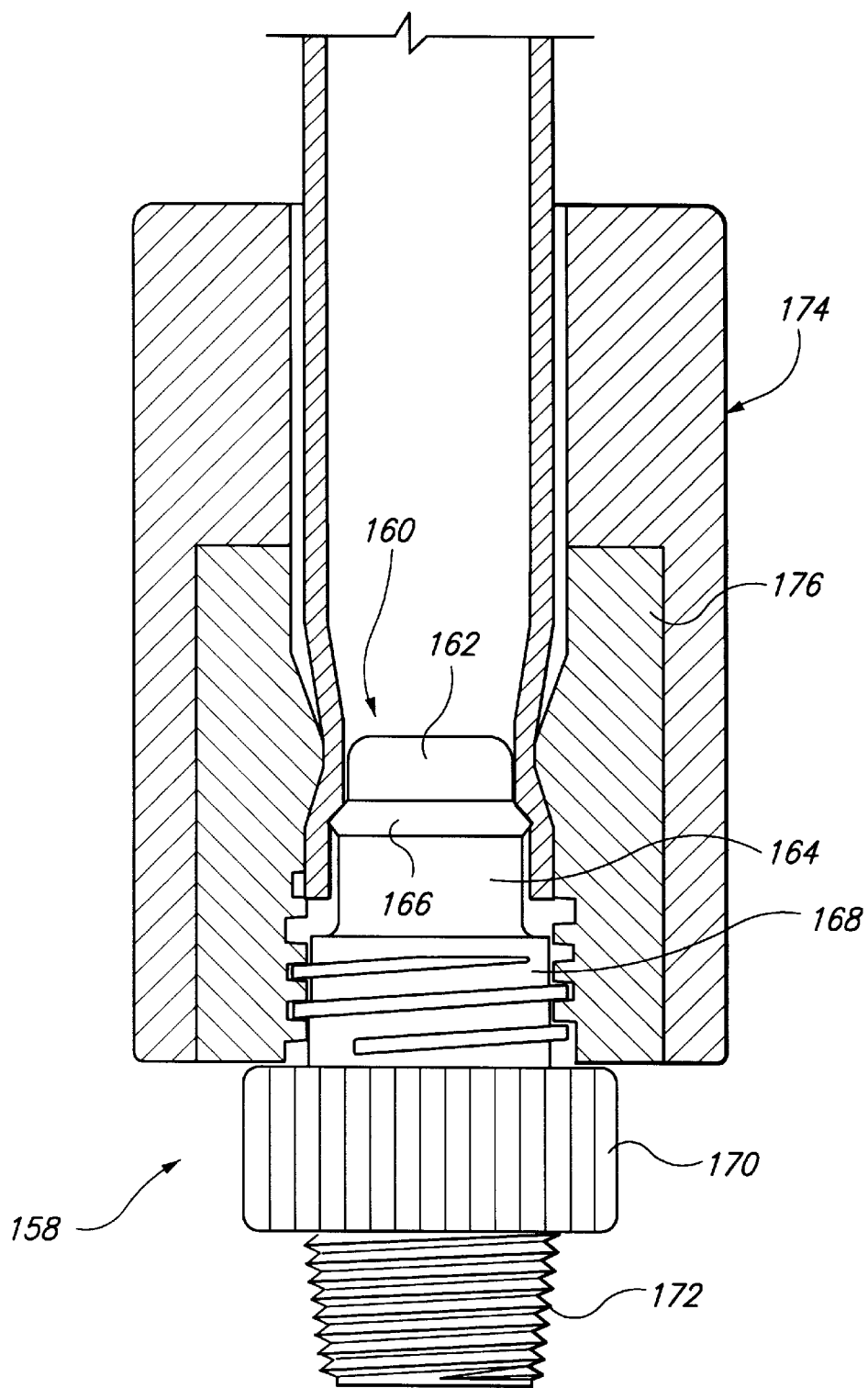
FIG. 8 is a side section through a drop weight and fitting in accordance with a fifth embodiment of the invention.

FIG. 8 shows yet another arrangement where the connector or fitting 158 is provided as a discrete component, adapted for connection to any of a variety of irrigation devices. More specifically, the fitting 158 includes a first connector portion 160 with relatively smaller and larger diameter portions 162, 164 separated by an annular barb 166 similar to the connector portion 150 in FIG. 7, along with an externally threaded portion 168. Here, however, the fitting is also formed with a ribbed hand grip section 170 and a standard ¾ NPT pipe thread end 172. This arrangement permits connection to various irrigation devices including spray heads of different design, regulators and the like. Of course, the threaded end 172 can be altered to suit requirements, for example, as a square-thread adapter or the like.

In this embodiment, the drop weight 174 may be formed with a threaded insert 176 (in contrast to the integral arrangement in FIG. 7) to facilitate manufacture. The insert 176 is threadably connected to the threaded portion 168 of the fitting. Thus, the fitting 158 otherwise interacts with the drop weight 174 in a manner similar to the embodiment shown in FIG. 7.

Advantageously, all of the weight clamp or drop weight components described herein may be provided with exterior "flats" to facilitate gripping with a wrench to prevent the weight clamps from turning when tightening the downstream irrigation components.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A drop weight and connector assembly for an irrigation component mounted at a lower end of a flexible hose, the assembly comprising:

a connector component having one end adapted for insertion into the lower end of the flexible hose; and a drop weight component comprising a relatively heavy tubular sleeve adapted to surround the lower end of the flexible hose and having an end that cooperates with said one end of said connector component to thereby clamp said lower end of said flexible hose radially between said connector and drop weight components; said tubular sleeve sufficiently heavy to provide stability to the flexible hose and irrigation component.

2. The assembly of claim 1 wherein said drop weight component weights at least 1 pound.

3. The assembly of claim 1 wherein said drop weight component is constructed of metal.

4. The assembly of claim 1 wherein an interior surface of said drop weight component is formed with an annular clamping ring.

5. The assembly of claim 1 wherein said interior surface of said drop weight component is formed with a pair of annular clamping rings.

6. The assembly of claim 1 wherein said drop weight component is formed as two identical half sleeves.

7. The assembly of claim 6 wherein said two identical half sleeves engage along interface edges having means thereon for locating and fastening said half sleeves.

8. The assembly of claim 1 wherein said one end of said connector component is barbed.

9. The assembly of claim 1 wherein an interior surface of said drop weight component is formed with an annular clamping ring; and wherein said drop weight component is formed as two identical half sleeves; and further wherein said two identical half sleeves engage along interface edges having means thereon for locating and fastening said half sleeves.

10. The assembly of claim 1 wherein said connector component has a second end that is threaded and adapted to receive a corresponding threaded end of the irrigation component.

11. A hose clamp and connector assembly for an irrigation component secured to a flexible hose comprising a first component having a barbed end adapted for insertion with one end of said flexible hose; and a second component comprising a cylindrical sleeve, one end of which is adapted to cooperate with said barbed end of said first component to clamp said one end of said flexible hose radially between said barbed end and said one end of said cylindrical sleeve, said cylindrical sleeve being sufficiently heavy to provide stability to the irrigation component and flexible hose.

12. The assembly of claim 11 wherein said second component is constructed of metal.

13. The assembly of claim 11 wherein said interior surface of said second component is formed with a pair of annular clamping rings.

14. The assembly of claim 11 wherein said second component is formed as two identical half sleeves.

15. The assembly of claim 14 wherein said two identical half sleeves engage along interface edges having means thereon for locating and fastening said half sleeves.

16. The assembly of claim 11 wherein said first component has a second end that is threaded and adapted to receive a corresponding threaded end of the irrigation component.

17. A hose clamp and connector assembly comprising a connector component adapted to have one end thereof inserted into a flexible tube; and a drop weight component comprising a substantially cylindrical sleeve, one end of which includes a removable segment adapted to cooperate with said connector component to clamp one end of said flexible tube radially between said one end of said connector component and said removable segment, wherein said drop weight component extends axially beyond said connector component and weighs at least 1 pound.

18. A hose clamp and connector assembly comprising a cylindrical weight component having a reduced diameter flange at one end thereof; and a connector assembly including a first part having a barbed end adapted for insertion into a hose end, and a second part comprising a cylindrical clamp including a groove for receiving said reduced diameter flange and a clamping ring adapted to clamp said hose end to said barbed end of said first part of said connector assembly.

19. A drop weight for an irrigation component comprising a cylindrical sleeve having a through bore including a first axial portion of substantially constant inside diameter commencing at one end of said sleeve; an internal thread at an opposite end of the sleeve; and a reduced diameter neck axially between said first axial portion and said internal thread.

20. The drop weight of claim 19 wherein said reduced diameter neck has a center portion comprising an annular ring and tapered portions extending in opposite directions from said annular ring.

21. The drop weight of claim 19 wherein said drop weight weighs at least one pound.

22. The drop weight of claim 19 in combination with a fitting and associated drop hose, said fitting including an externally threaded portion at one end thereof adapted to threadably engage said internal thread in said sleeve, and a portion extending beyond said externally threaded portion formed with an annular barb; said drop hose having one end pushed over said annular barb; and wherein said reduced diameter neck presses said drop hose into engagement with said annular barb when said sleeve is fully threaded into said irrigation component.

23. The drop weight of claim 22 wherein said drop weight weighs at least one pound.

24. The drop weight of claim 22 wherein said fitting further comprises an external thread on an opposite end thereof adapted for connection to an irrigation device.

25. The drop weight of claim 24 wherein said internal thread and said reduced diameter neck are formed on an insert received in said cylindrical sleeve.

* * * * *

UNITED STATES PATENT AND TRADEMARK OFFICE
CERTIFICATE OF CORRECTION

PATENT NO. : 6,554,233 B1
DATED : April 29, 2003
INVENTOR(S) : Ungerecht

It is certified that error appears in the above-identified patent and that said Letters Patent is hereby corrected as shown below:

Column 1,
Line 57, delete "axially spaced" and insert -- axially-spaced --.

Column 2,
Line 8, delete "that weight" and insert -- the weight --.
Line 27, delete "integrally threaded" and insert -- integrally-threaded --.
Line 29, delete "internal reduced" and insert -- internally-reduced --.

Column 3,
Line 51, delete "a" between "includes" and "relatively."

Column 4,
Lines 26 and 29, after "sprinkler head 16" insert -- (FIGS. 1 and 2) --.
Line 52, delete "weights" and insert -- weighs --.
Lines 55 and 56, delete "above described" and insert -- above-described --.

Column 5,
Line 15, delete "weight 104" and insert -- weight sleeve 104 --.
Line 47, delete "weights" and insert -- weighs --.
Lines 51 and 60, delete "externally threaded" and insert -- externally-threaded --.

Column 6,
Line 35, delete "weights" and insert -- weighs -- and delete "pound" and insert -- lb. --.

Column 7,
Line 25, delete "pound" and insert -- lb. --.

Column 8,
Line 13, delete "pound" and insert -- lb. --.
Lines 16 and 18, delete "externally threaded" and insert -- externally-threaded --.

UNITED STATES PATENT AND TRADEMARK OFFICE
CERTIFICATE OF CORRECTION

PATENT NO. : 6,554,233 B1
DATED : April 29, 2003
INVENTOR(S) : Ungerecht

It is certified that error appears in the above-identified patent and that said Letters Patent is hereby corrected as shown below:

<u>Column 8 (cont'd)</u>,
Line 26, delete "one pound" and insert -- 1 lb. --.

Signed and Sealed this

Third Day of February, 2004

JON W. DUDAS
*Acting Director of the United States Patent and Trademark Office*